(12) United States Patent
Othman et al.

(10) Patent No.: US 9,503,221 B2
(45) Date of Patent: Nov. 22, 2016

(54) METHOD FOR ADJUSTING AGGREGATION SIZE BASED ON ACKNOWLEDGMENT (ACK) BITMAP

(71) Applicant: Universiti Putra Malaysia, Serdang (MY)

(72) Inventors: Mohamed Othman, Serdang (MY); Anwar Saif, Serdang (MY)

(73) Assignee: Universiti Putra Malaysia, Serdang, Selangor (MY)

( * ) Notice: Subject to any disclaimer, the term of this patent is extended or adjusted under 35 U.S.C. 154(b) by 0 days.

(21) Appl. No.: 14/439,272

(22) PCT Filed: Sep. 23, 2013

(86) PCT No.: PCT/MY2013/000170
§ 371 (c)(1),
(2) Date: Apr. 29, 2015

(87) PCT Pub. No.: WO2014/069980
PCT Pub. Date: May 8, 2014

(65) Prior Publication Data
US 2015/0295680 A1    Oct. 15, 2015

(30) Foreign Application Priority Data

Oct. 30, 2012  (MY) .......................... PI 2012700842

(51) Int. Cl.
*H04W 4/00*       (2009.01)
*H04L 1/16*       (2006.01)
*H04L 1/18*       (2006.01)
*H04L 1/20*       (2006.01)
*H04L 5/00*       (2006.01)

(52) U.S. Cl.
CPC ........... *H04L 1/1614* (2013.01); *H04L 1/1825* (2013.01); *H04L 1/203* (2013.01); *H04L 5/0055* (2013.01)

(58) Field of Classification Search
None
See application file for complete search history.

(56) References Cited

U.S. PATENT DOCUMENTS

| 2007/0206508 A1 | 9/2007 | Sammour |
| 2009/0257449 A1 | 10/2009 | Chen et al. |
| 2011/0206030 A1 | 8/2011 | Hoshino et al. |

OTHER PUBLICATIONS

Frohn, et al., "Analyzing the effective throughput in multi-hop IEEE 802.11n networks", Oct. 1, 2011, pp. 1912-1921, vol. 34, No. 16, Publisher: Computer Communications (Abstract).
(Continued)

*Primary Examiner* — Kibrom T Hailu
(74) *Attorney, Agent, or Firm* — Suzannah K. Sundby, Esq.; Canady + Lortz LLP

(57) ABSTRACT

The present invention relates to a method for adjusting aggregation size based on Acknowledgement (ACK) bitmap, characterized by the steps of: receiving $k^{th}$ Compressed Block Acknowledgement (CBA); calculating granularity factor (g) by applying Equation (1); determining bit error density $(BED_k)$ for $k^{th}$ CBA by applying Equation (2); receiving $(k+1)^{th}$ CBA; determining bit error density $(BED_{(k+1)})$ for $(k+1)^{th}$ CBA by applying Equation (2); adjusting the aggregation size based on the value of granularity factor (g), $k^{th}$ bit error density $BED_{k+1}$ values and $(k+1)^{th}$ bit error density $BED_{k+1}$; wherein if the $k^{th}$ bit error density $BED_k$ is greater than the $(k+1)^{th}$ bit error density $BED_{k+1}$, then increasing the aggregation size based on the value of granularity factor (g); wherein if the $k^{th}$ bit error density $BEO_k$ is lower than the $(k+1)^{th}$ bit error density $BED_{k+1}$ then decreasing the aggregation size based on the value of granularity factor (g); wherein if the $k^{th}$ bit error density $BED_k$ is equal to the $(k+1)^{th}$ bit error density $BED_{k+1}$ then the aggregation size is kept unchanged.

4 Claims, 2 Drawing Sheets

(56) References Cited

OTHER PUBLICATIONS

International Search Report received in PCT/MY2013/000170, mailed Jan. 20, 2014.

Lou, et al., "Throughput maximization of a Hybrid Dynamic Frame Aggregation and Block-ACK scheme for 60 GHz high speed communications", Sep. 26, 2010, pp. 1248,1253, Publisher: Personal Indoor and Mobile Radio Communications (PIMRC), 2010 IEEE 21st International Symposium on (Abstract).

METHOD FOR ADJUSTING AGGREGATION SIZE BASED ON ACKNOWLEDGMENT (ACK) BITMAP

BACKGROUND OF THE INVENTION

1. Field of the Invention

This invention relates to a method for adjusting aggregation size based on ACKnowledgement (ACK) bitmap, and more particularly to a method of dynamic aggregation size adjustment during frame aggregation in a network communication.

2. Description of Related Arts

The IEEE 802.11n standard defines two types of aggregation, Aggregate Media Access Control (MAC) Service Data Unit (A-MSDU) and Aggregate MAC Protocol Data Unit (A-MPDU). The A-MPDU aggregation combines multiple MAC protocol data units (MPDU) in a single PHYsical layer (PHY) Protocol Data Unit (PPDU) frame and transmits it in a single channel access. The size of the PPDU constructed by A-MPDU aggregation has upper bounds either 64 Kbytes or 64 MPDUs, the one reached earlier.

The 802.11n standard defines a Compressed Block Acknowledgment (CBA) to acknowledge the A-MPDU frame. The CBA is a variation of the block acknowledgment introduced by 802.11n in order to acknowledge the aggregate A-MPDU frames with a single ACK frame. The CBA frame contains a bitmap field of 64 bits. Each bit of the bitmap acknowledges one MPDU of the A-MPDU frame. The corrupted MPDU will be indicated by a zero in the bitmap while the successfully received MPDU will be indicated by one. The corrupted MPDUs in the A-MPDU frame will be retransmitted in subsequent transmissions. The CBA bitmap can be read as a clear map of the current channel condition.

It is recommended to send A-MPDU frame with large number of MPDUs if the channel is error free, but if the channels of high Bit Error Rate (BER) large number of these MPDUs will be corrupted and marked in the CBA bitmap for retransmission. Sending A-MPDU of large number of MPDUs in environment with high error rate probability will lead to wasting the channel time and degrading the network performance. Many analytical and simulation works have been carried out in order to estimate the optimal frame size that would increase the throughput and reduce the delay under different network conditions.

Accordingly, it can be seen in the prior arts that there exists a need to provide a method for dynamically adapts the A-MPDU aggregation size to the current state of the channel. The channel conditions can be read from the CBA bitmap of the previous frames transmissions without requiring additional data transmission.

SUMMARY OF INVENTION

It is an objective of the present invention to provide a method for adjusting aggregation size based on ACK bitmap.

It is also an objective of the present invention to provide a method for adjusting the frame aggregation size in the wireless network.

It is yet another objective of the present invention to provide a method for adjusting the frame aggregation size without transmitting additional data.

Accordingly, these objectives may be achieved by following the teachings of the present invention. The present invention relates to a method for adjusting aggregation size based on ACK bitmap, characterized by the steps of: receiving $k^{th}$ Compressed Block Acknowledgement (CBA); calculating granularity factor (g) by applying Equation (1); determining bit error density ($BED_k$) for $k^{th}$ CBA by applying Equation (2); receiving $(k+1)^{th}$ CBA; determining bit error density ($BED_{k+1}$) for $(k+1)^{th}$ CBA by applying Equation (2); adjusting the aggregation size based on the value of granularity factor (g), $k^{th}$ bit error density $BED_k$ values and $(k+1)^{th}$ bit error density $BED_{k+1}$; wherein if the $k^{th}$ bit error density $BED_k$ is greater than the $(k+1)^{th}$ bit error density $BED_{k+1}$, then increasing the aggregation size based on the value of granularity factor (g); wherein if the $k^{th}$ bit error density $BED_k$ is lower than the $(k+1)^{th}$ bit error density $BED_{k+1}$ then decreasing the aggregation size based on the value of granularity factor (g); wherein if the $k^{th}$ bit error density $BED_k$ is equal to the $(k+1)^{th}$ bit error density $BED_{k+1}$ then the aggregation size is kept unchanged.

BRIEF DESCRIPTION OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
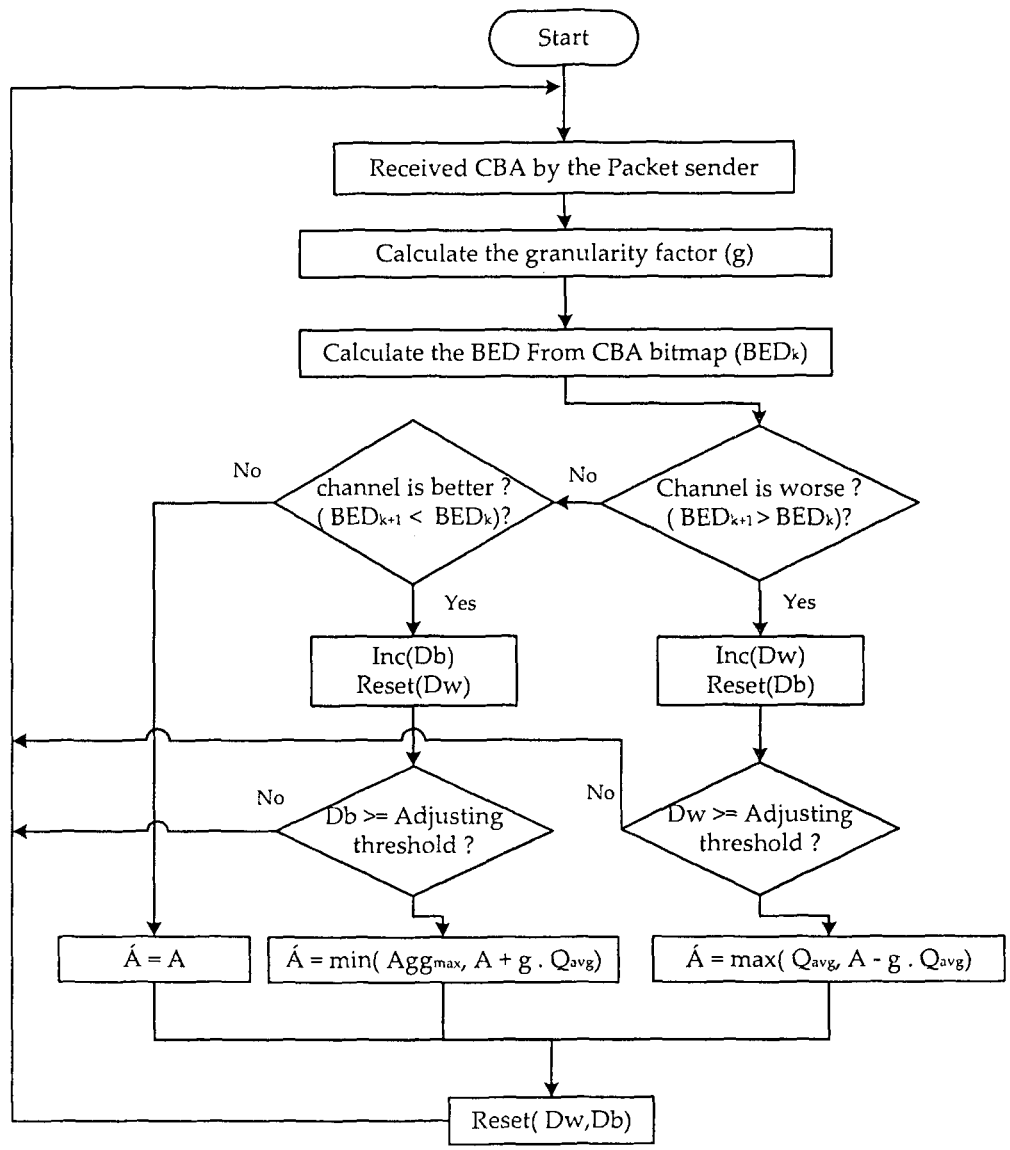
FIG. 1 is a flow chart of a method for adjusting aggregation size based on ACK bitmap.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modification, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field. For ease of reference, common reference numerals will be used throughout the figures when referring to the same or similar features common to the figures. The present invention will now be described with reference to FIGS. 1-2.

The present invention relates to a method for adjusting aggregation size based on ACK bitmap, characterized by the steps of:

receiving $k^{th}$ Compressed Block Acknowledgement (CBA), wherein k is sequence of receiving CBA;

calculating granularity factor (g) by applying Equation (1);

$$g = \lceil Agg_{max}/Q_{avg} * 128 \rceil \quad (1)$$

wherein,

Agg$_{max}$ is a maximum aggregation,

Q$_{avg}$ is an average queue size;

determining bit error density (BED$_k$) for k$^{th}$ CBA by applying Equation (2);

$$BED_k = b_z/b_t \quad (2)$$

wherein, b$_z$ is a number of zero bits of the k$^{th}$ ACK, b$_t$ is a total number of used bits of the k$^{th}$ ACK;

receiving (k+1)$^{th}$ CBA;

determining bit error density (BED$_{k+1}$) for (k+1)$^{th}$ CBA by applying Equation (2);

adjusting the aggregation size based on the value of granularity factor (g), k$^{th}$ bit error density BED$_k$ values and (k+1)$^{th}$ bit error density BED$_{k+1}$;

wherein if the k$^{th}$ bit error density BED$_k$ is greater than the (k+1)$^{th}$ bit error density BED$_{k+1}$, then increasing the aggregation size based on the value of granularity factor (g);

wherein if the k$^{th}$ bit error density BED$_k$ is lower than the (k+1)$^{th}$ bit error density BED$_{k+1}$ then decreasing the aggregation size based on the value of granularity factor (g);

wherein if the k$^{th}$ bit error density BED$_k$ is equal to the (k+1)$^{th}$ bit error density BED$_{k+1}$ then the aggregation size is kept unchanged.

In a preferred embodiment of the method for adjusting aggregation size based on ACK bitmap, the aggregation size should not exceed 64 Kbytes defined by the 802.11n standard.

In a preferred embodiment of the method for adjusting aggregation size based on ACK bitmap, a minimum aggregation size is an average packet size in a queue.

In a preferred embodiment of the method for adjusting aggregation size based on ACK bitmap, a stability threshold (D$_b$, D$_w$) is used to avoid false decision and fast fluctuation.

In a preferred embodiment, the IEEE 802.11n standard defines two types of aggregation, aggregate MAC service data unit (A-MSDU) and aggregate MAC protocol data unit (A-MPDU). The A-MPDU aggregation combines multiple MAC protocol data units (MPDU) in a single physical layer (PHY) protocol data unit (PPDU) frame and transmits it in a single channel access. The size of the PPDU constructed by A-MPDU aggregation has upper bounds either 64 Kbytes or 64 MPDUs, the one reached earlier. Thus, the present method for adjusting aggregation size based on ACK bitmap uses the aggregation size which not exceeded 64 Kbytes.

In a preferred embodiment, the method for adjusting aggregation size based on ACK bitmap uses the density of zeros in the bitmap as a criterion to either increase or decrease the aggregation size and to reduce additional data transmission.

In a preferred embodiment, the method for adjusting aggregation size based on ACK bitmap starts by receiving the CBA from a sender and then calculates the granularity factor g, BED$_k$, and the BED$_{k+1}$. Based on the values of the BED$_{k+1}$ and BED$_k$, the aggregation size ($\overline{A}$) will be adjusted or kept unchanged. If quality of a wireless network is getting bad wherein the BED$_{k+1}$ is greater than the BED$_k$ (BED$_{k+1}$ > BED$_k$), then the current aggregation size ($\overline{A}$) will be decreased by a factor g. If quality of the wireless network is getting better (BED$_{k+1}$ < BED$_k$), then the aggregation size will be increased by a factor of g. Otherwise, if the BED$_k$ is equal to the BED$_{k+1}$, (BED$_k$ = BED$_{k+1}$), thus it means that the network is stable and the current aggregation size will be kept unchanged.

In a preferred embodiment, to avoid a false decision and a fast fluctuation in the aggregation size due to sudden change in the wireless network, value of the BED$_{k+1}$ will not be determined by a single CBA but on a range of received CBA which is called as adjusting threshold (D). The aggregation size will not be changed unless the stability threshold is satisfied.

In a preferred embodiment, the counters (D$_w$) will be incremented if the BED$_{k+1}$ is greater than BED$_k$ otherwise the counters (D$_w$) will be reset to zero. Similarly (D$_b$) will be incremented if the new BED$_{k+1}$ is less than BED$_k$ otherwise (D$_b$) will be reset to zero. Readjusting the aggregation size will be performed only if either D$_w$ or D$_b$ reached the adjusting threshold.

Figure 2:
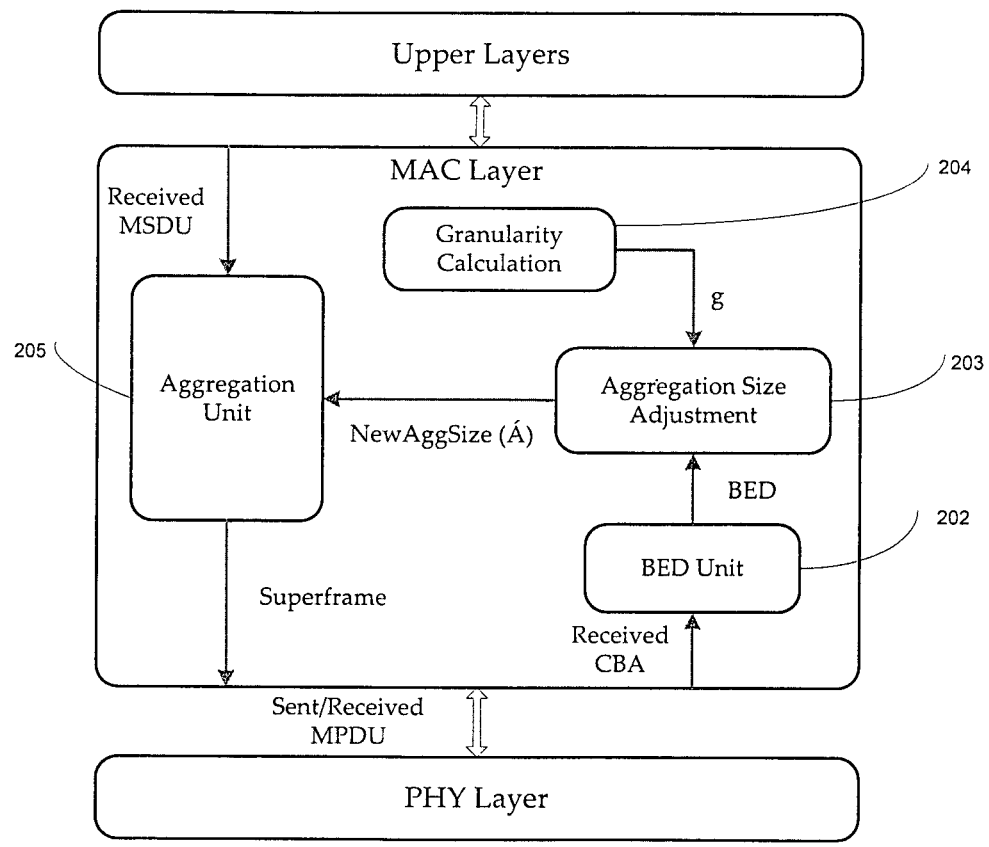
FIG. 2 is the block diagram of the method for adjusting aggregation size based on ACK bitmap.

In a preferred embodiment, a block diagram depicting components that interact with each other to accomplish the method for adjusting aggregation size based on ACK bitmap is shown in FIG. 2. The present method relies on the ACK bitmap received as an acknowledgement of the recently sent A-MPDU. A BED unit (202) as shown in FIG. 2 is responsible for calculating the BED from the ACK bitmap by checking the ratio of the zero bits (b$_z$) to the total number of used bits (b$_t$), BED$_k$ = b$_z$/b$_t$ where 0 ≤ b$_z$ ≤ 64 and 1 ≤ b$_t$ ≤ 64.

In a preferred embodiment, a granularity calculation unit (204) determines the granularity factor (g) which determines the number of frames by which the aggregation should be incremented or decremented. The granularity unit (204) uses the maximum aggregation (Agg$_{max}$) defined by the 802.11n and the average queue size (Q$_{avg}$) to determine the g factor (g = ⌈Agg$_{max}$/Q$_{avg}$ *128⌉).

In a preferred embodiment, the aggregate A-MPDU comprises multiple MPDUs. The value of g depends on the size of the majority packets in the queue. For example, an average packet size of 1500 will cause the aggregation size to be adjusted to equip/de-equip one MPDU while an average packet size of 128 will adjust the aggregation to equip/de-equip 4 MPDUs. Thus, the aggregation size will be adjusted by only one MPDU if the majority of the packets are large packets.

In a preferred embodiment, the aggregation size adjusting unit (203) relies on the parameters received from BED$_k$ calculation of the BED unit (202) and the granularity calculation of the granularity unit (204). The aggregation size adjusting unit (203) adjusts the aggregation size based on the BED$_{k+1}$ and the BED$_k$, and the new aggregation size is fed to an aggregation unit (205). The new aggregation size will then be used in the subsequent transmissions.

Adjusting the aggregation size in wireless networks according to the current wireless status is significant in preserving the wireless airtime and increasing the wireless network performance. Thus, in a preferred embodiment for error free channels and for the majority of applications it is preferable to increase the aggregation size to accommodate a large number of MPDUs in a single transmission. However, for erroneous channels the aggregation size should be decreased in order to avoid MPDUs corruption that results in an excessive retransmission.

Below is an example of the method for adjusting aggregation size based on ACK bitmap from which the advantages of the present invention may be more readily understood. It is to be understood that the following example is for illustrative purpose only and should not be construed to limit the present invention in any way.

EXAMPLES

The maximum aggregation size (Agg$_{max}$) is 64 KB as defined by the 802.11n standard. The Size of the ACK bitmap = 64 bits, as defined by the 802.11n standard. Table (1) shows the values of g at different Queue average according to the equation (1):

$$g = \lceil Agg_{max}/Q_{avg} *128 \rceil$$

TABLE (1)

The Average Queue size and corresponding g value

| Average Queue Size ($Q_{avg}$) in Bytes | Value of g |
|---|---|
| 2000 | 1 |
| 1500 | 1 |
| 1024 | 1 |
| 512 | 1 |
| 256 | 2 |
| 128 | 4 |
| 100 | 5 |
| 64 | 8 |

Example 1

$k^{th}$ bit error density $BED_k$ is lower than the $(k+1)^{th}$ bit error density $BED_{k+1}$, $BED_{k+1} > BED_k$.
The Compressed Block ACK is received as in table (2):
Total used bits=20 ($b_0$ to $b_{19}$);
Number of successfully received subframes=14;
Number of corrupted subframes=6 then;
$b_t$=20;
$b_z$=6;
BED=$b_z/b_t$=6/20=0.30, this Bit Error Density (BED) will be called $BED_k$;
$BED_k$=0.30.

TABLE (2)

The $k^{th}$ CBA
The ACK Bit Map

| 0 | 1 | 2 | 3 | 4 | 5 | 6 | 7 | 8 | 9 | 10 | 11 | 12 | 13 | 14 | 15 | 16 | 17 | 18 | 19 | ... | 63 |
|---|---|---|---|---|---|---|---|---|---|---|---|---|---|---|---|---|---|---|---|---|---|
| 1 | 1 | 0 | 0 | 1 | 1 | 0 | 1 | 1 | 0 | 1 | 1 | 0 | 1 | 1 | 0 | 1 | 1 | 1 | ... | 0 |

The next Compressed Block ACK is received as in table (3):
Total used bits=15 ($b_0$ to $b_{14}$);
Number of successfully received subframes=8;
Number of corrupted subframes 7;
$b_t$=15;
$b_z$=7;
BED=$b_z/b_t$=7/15=0.46, this Bit Error Density (BED) will be $(BED_{(k+1)})$;
$(BED_{(k+1)})$=0.46.

TABLE (3)

The $(k + 1)^{th}$ CBA
The ACK Bit Map

| 0 | 1 | 2 | 3 | 4 | 5 | 6 | 7 | 8 | 9 | 10 | 11 | 12 | 13 | 14 | ... | 63 |
|---|---|---|---|---|---|---|---|---|---|---|---|---|---|---|---|---|
| 1 | 1 | 0 | 0 | 1 | 1 | 0 | 0 | 1 | 0 | 1 | 0 | 0 | 1 | 1 | ... | 0 |

Since $(BED_{k+1} > BED_k)$, then the new aggregation size will be calculated by using Equation (3):

$$\overline{A} = \max(Q_{avg}, A - g \cdot Q_{avg}) \quad (3)$$

From Table (1), if we consider the $Q_{avg}$=256, then the value of g will be 2. By assuming that the current aggregation size (A) is 2000 Bytes, then:

$$\overline{A} = \max(256, 2000 - 2 * 256)$$
$$= \max(256, 2000 - 512)$$
$$= \max(256, 1488)$$
$$= 1488$$

The new aggregation size is reduced to 1488;
$\overline{A}$=1488

Example 2

$k^{th}$ bit error density $BED_k$ is greater than the $(k+1)^{th}$ bit error density $BED_{k+1}$, $BED_{k+1} < BED_k$.
The Compressed Block ACK is received as in Table (4):
Total used bits=20 ($b_0$ to $b_{19}$);
Number of successfully received subframes=14;
Number of corrupted subframes=6;
$b_t$=20;
$b_z$=6;
BED=$b_z/b_t$=6/20=0.30, this BED will be called $k^{th}$ BED, $BED_k$;
$BED_k$=0.30.

TABLE (4)

The $k^{th}$ CBA
The ACK Bit Map

| 0 | 1 | 2 | 3 | 4 | 5 | 6 | 7 | 8 | 9 | 10 | 11 | 12 | 13 | 14 | 15 | 16 | 17 | 18 | 19 | ... | 63 |
|---|---|---|---|---|---|---|---|---|---|---|---|---|---|---|---|---|---|---|---|---|---|
| 1 | 1 | 0 | 0 | 1 | 1 | 0 | 1 | 1 | 0 | 1 | 1 | 0 | 1 | 1 | 0 | 1 | 1 | 1 | ... | 0 |

The next Compressed Block ACK is received as in Table (5):
Total used bits=15 ($b_0$ to $b_{14}$);
Number of successfully received subframes=11;
Number of corrupted subframes=4;
$b_t$=15;
$b_z$=4;
BED=$b_z/b_t$=4/15=0.26, this BED will be called $(k+1)^{th}$ BED, $BED_{k+1}$; $BED_{k+1}$=0.26.

TABLE (5)

| The $(k+1)^{th}$ CBA The ACK Bit Map | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | ... 63 |
| 1 | 1 | 0 | 1 | 1 | 1 | 0 | 1 | 1 | 0 | 1 | 1 | 0 | 1 | 1 | ... 0 |

Since $BED_{k+1} < BED_k$, then the new aggregation size will be calculated by using Equation (3):

$$\overline{A} = \max(Q_{avg}, A - g \cdot Q_{avg}) \quad (3)$$

From Table (1), if we consider the $Q_{avg}$=256, then the value of g will be 2. By assuming that the current aggregation size (A) is 2000 Bytes, then:

$$\overline{A} = \min(64000, 2000 + 2*256)$$
$$= \min(256, 2000 + 512)$$
$$= \min(256, 2512)$$
$$= 2512$$

The new aggregation size is increased to 2512 Bytes; $\overline{A}$=2512.

Example 3

$k^{th}$ bit error density $BED_k$ is equal to the $(k+1)^{th}$ bit error density $BED_{k+1}$, $BED_k = BED_{k+1}$.

The next Compressed Block ACK is received as in Table (6):
Total used bits=20 ($b_0$ to $b_{19}$);
Number of successfully received subframes=14;
Number of corrupted subframes=6;
$b_t$=20;
$b_z$=6;
BED=$b_z/b_t$=6/20=0.30, this BED will be called $BED_k$; $BED_k$=0.30.

TABLE (6)

| The $k^{th}$ CBA The ACK Bit Map | | | | | | | | | | | | | | | | | | | | |
|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | ... 63 |
| 1 | 1 | 0 | 0 | 1 | 1 | 0 | 1 | 1 | 0 | 1 | 1 | 0 | 1 | 1 | 0 | 1 | 1 | 1 | 1 | ... 0 |

The $(k+1)^{th}$ Compressed Block ACK is received as in Table (7):
Total used bits=10 ($b_0$ to $b_{14}$);
Number of successfully received subframes=7;
Number of corrupted subframes=3;
$b_t$=10;
$b_z$=3;
BED=$b_z/b_t$=3/10=0.3, this BED will be called $BED_{k+1}$; $BED_{k+1}$=0.3.

TABLE (7)

| The $(k+1)^{th}$ CBA The ACK Bit Map | | | | | | | | | | |
|---|---|---|---|---|---|---|---|---|---|---|
| 0 | 1 | 2 | 3 | 4 | 5 | 6 | 7 | 8 | 9 | ... 63 |
| 1 | 1 | 0 | 0 | 1 | 1 | 1 | 1 | 1 | 0 | ... 0 |

Since ($BED_k = BED_{k+1}$), By assuming that the current aggregation size (A) is 2000 Bytes, then the new aggregation size will be kept unchanged
$\overline{A}$=A
$\overline{A}$=2000

Although the present invention has been described with reference to specific embodiments, also shown in the appended figures, it will be apparent for those skilled in the art that many variations and modifications can be done within the scope of the invention as described in the specification and defined in the following claims.

Description of the reference numerals used in the accompanying drawings according to the present invention:

| Reference Numerals | Description |
|---|---|
| 202 | BED unit |
| 203 | Aggregation size adjusting unit |
| 204 | Granularity calculation unit |
| 205 | Aggregation unit |

We claim:

1. A method for adjusting aggregation size based on Acknowledgement (ACK) bitmap with a media access controller (MAC), which comprises
   receiving $k^{th}$ Compressed Block Acknowledgement (CBA), wherein $k^{th}$ is sequence of receiving CBA;
   calculating granularity factor (g) by applying Equation (1);

$$g = \lceil Agg_{max}/Q_{avg} *128 \rceil \quad (1)$$

wherein, $Agg_{max}$ is a maximum aggregation, $Q_{avg}$ is an average queue size;
   determining bit error density ($BED_k$) for $k^{th}$ CBA by applying Equation (2);

$$BED_k = b_z/b_t \quad (2)$$

wherein, $b_z$ is a number of zero bits of the $k^{th}$ ACK, $b_t$ is a total number of used bits of the $k^{th}$ ACK;
   receiving $(k+1)^{th}$ CBA;

determining bit error density ($BED_{k+1}$) for $(k+1)^{th}$ CBA by applying Equation (2);

adjusting the aggregation size based on the value of granularity factor (g), $k^{th}$ bit error density $BED_k$ values and $(k+1)^{th}$ bit error density $BED_{k+1}$;

wherein if the $k^{th}$ bit error density $BED_k$ is greater than the $(k+1)^{th}$ bit error density $BED_{k+1}$, then increasing the aggregation size based on the value of granularity factor (g);

wherein if the $k^{th}$ bit error density $BED_k$ is lower than the $(k+1)^{th}$ bit error density $BED_{k+1}$ then decreasing the aggregation size based on the value of granularity factor (g);

wherein if the $k^{th}$ bit error density $BED_k$ is equal to the $(k+1)^{th}$ bit error density $BED_{k+1}$ then the aggregation size is kept unchanged.

2. The method according to claim 1, wherein the aggregation size should not exceed 64 Kbyte defined by the 802.11n standard.

3. The method according to claim 1, wherein a minimum aggregation size is an average packet size in a queue.

4. The method according to claim 1, wherein a stability threshold ($D_b,D_w$) is used to avoid false decision and fast fluctuation.

\* \* \* \* \*